(12) United States Patent
Albrecht

(10) Patent No.: US 10,837,305 B2
(45) Date of Patent: Nov. 17, 2020

(54) HYBRID JET ENGINE

(71) Applicant: Kyle Albrecht, Pleasant Valley, NY (US)

(72) Inventor: Kyle Albrecht, Pleasant Valley, NY (US)

( * ) Notice: Subject to any disclaimer, the term of this patent is extended or adjusted under 35 U.S.C. 154(b) by 177 days.

(21) Appl. No.: 16/139,600

(22) Filed: Sep. 24, 2018

(65) Prior Publication Data

US 2020/0095884 A1    Mar. 26, 2020

(51) Int. Cl.
  *F01D 15/10* (2006.01)
  *F01D 13/00* (2006.01)
  *F01D 1/34* (2006.01)

(52) U.S. Cl.
  CPC .............. *F01D 15/10* (2013.01); *F01D 1/34* (2013.01); *F01D 13/00* (2013.01); *F05D 2220/76* (2013.01)

(58) Field of Classification Search
  CPC .... B60K 6/20; B60K 6/24; B64D 2033/0273; B64D 2033/0286; F01D 1/30; F01D 1/34; F01D 5/021; F01D 13/00; F02C 3/14; F02C 7/04; F02K 1/386; F02K 3/00; F02K 3/02; F02K 3/025; F02K 3/06; F02K 3/065; F02K 7/06; F02K 7/067; F02K 7/10; F02K 7/12
  See application file for complete search history.

(56) References Cited

U.S. PATENT DOCUMENTS

| | | | | |
|---|---|---|---|---|
| 2,612,749 A | * | 10/1952 | Tenney | F02K 7/04 60/249 |
| 3,365,880 A | * | 1/1968 | Grebe | F02K 7/06 60/773 |
| 2014/0345281 A1 | * | 11/2014 | Galbraith | B60K 6/24 60/716 |

* cited by examiner

*Primary Examiner* — Scott J Walthour
(74) *Attorney, Agent, or Firm* — The Iwashko Law Firm, PLLC; Lev Ivan Gabriel Iwashko

(57) ABSTRACT

A hybrid jet engine, including a front cowling having a tubular shape, a rear cowling having a tubular shape and connected to the front cowling, a central core disposed within the front cowling and the rear cowling, a shaft disposed longitudinally within the central core, a plurality of main fan blades disposed at a first end of the shaft at the front cowling, a plurality of auxiliary fan blades disposed at a second end of the shaft at the rear cowling, at least one aerodynamic stabilizer disposed on a surface of the central core to extend therefrom, and at least one Tesla one way valve disposed on the surface of the central core to receive the ram air and to provide the ram air to the plurality of auxiliary fan blades.

6 Claims, 7 Drawing Sheets

HYBRID JET ENGINE

BACKGROUND

1. Field

The present general inventive concept relates generally to jet engines, and specifically, to a hybrid jet engine.

2. Description of the Related Art

Technological advancements have helped the aviation sciences develop equipment that is more efficient, more environmentally-friendly, and cheaper to produce. However, innovations in aviation are not as prevalent as other forms of technology, and jet engines may be inefficient, overly-consumptive of fuel, and lacking in environmentally-safe use.

Therefore, there is a need for a hybrid jet engine that is efficient and environmentally friendly.

SUMMARY

The present general inventive concept provides a hybrid jet engine.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a hybrid jet engine, including a front cowling having a tubular shape, a rear cowling having a tubular shape and connected to the front cowling, such that the rear cowling is smaller than the front cowling, a central core disposed within the front cowling and the rear cowling, a shaft disposed longitudinally within the central core, a plurality of main fan blades disposed at a first end of the shaft at the front cowling, a plurality of auxiliary fan blades disposed at a second end of the shaft at the rear cowling, at least one aerodynamic stabilizer disposed on a surface of the central core to extend therefrom, to provide connected between the central core and the front cowling, and at least one modified Tesla one way valve disposed on the surface of the central core to receive the ram air and to provide the ram air to the plurality of auxiliary fan blades, such that the air is recycled through the shaft of the central core to power the plurality of main fan blades.

A rear portion of the at least one modified Tesla one way valve may include at least one of a carburetor and fuel injecting system to add fuel to the ram air as it expands and before it begins its compression.

The hybrid jet engine may include an ignition system to ignite the fuel/air mixture such that the fuel/air mixture is forced out the rear portion of the hybrid jet engine towards the auxiliary fan blades.

The aerodynamic stabilizer may include a bladeless turbine disposed at a front portion of the aerodynamic stabilizer to receive ram air from the plurality of main fan blades, a generator/alternator disposed at a rear portion of the aerodynamic stabilizer to receive energy from the bladeless turbine in response to the ram air received by the bladeless turbine.

The aerodynamic stabilizer may provide air exhaust to the at least one modified Tesla one way valves and electricity to the central core.

The at least one modified Tesla one way valve may recieve the ram air from the plurality of main fan blades and the bladeless turbine, and is injected with fuel and a combustible fuel/air mixture near a rear portion of the hybrid jet engine.

The at least one modified Tesla one way valve may provide exhaust to power the plurality of auxiliary fan blades.

BRIEF DESCRIPTION OF THE DRAWINGS

These and/or other features and utilities of the present generally inventive concept will become apparent and more readily appreciated from the following description of the embodiments, taken in conjunction with the accompanying drawings of which.

DETAILED DESCRIPTION

Various example embodiments (a.k.a., exemplary embodiments) will now be described more fully with reference to the accompanying drawings in which some example embodiments are illustrated. In the figures, the thicknesses of lines, layers and/or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like/similar elements throughout the detailed description.

It is understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art. However, should the present disclosure give a specific meaning to a term deviating from a meaning commonly understood by one of ordinary skill, this meaning is to be taken into account in the specific context this definition is given herein.

Figure 1A:
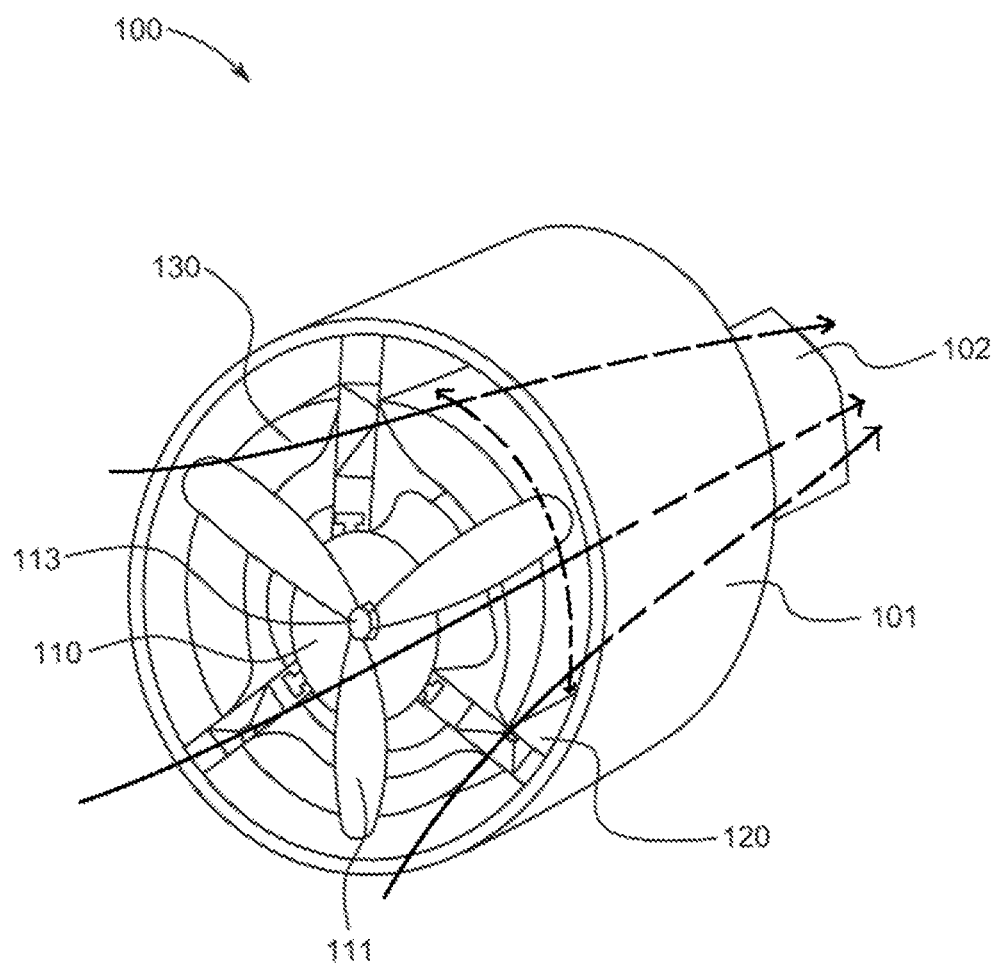
FIG. 1A illustrates a front angled perspective view of a hybrid jet engine, according to an exemplary embodiment of the present general inventive concept.

FIG. 1A illustrates a front angled perspective view of a hybrid jet engine 100, according to an exemplary embodiment of the present general inventive concept.

Figure 1B:
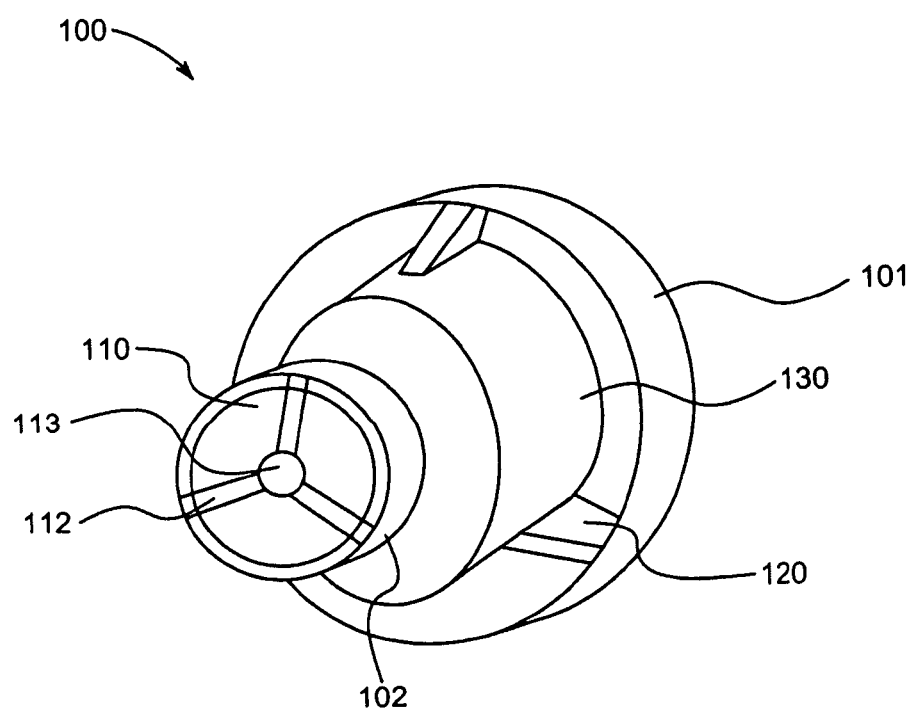
FIG. 1B illustrates a rear angled perspective view of the hybrid jet engine, according to an exemplary embodiment of the present general inventive concept.

FIG. 1B illustrates a rear angled perspective view of the hybrid jet engine 100, according to an exemplary embodiment of the present general inventive concept.

Referring to FIGS. 1A and 1B, the hybrid jet engine 100 may include a front cowling 101, a rear cowling 102, a central core 110, at least one aerodynamic stabilizer 120, and at least one modified Tesla one way valve 130, but is not limited thereto.

The front cowling 101 may have a tubular shape, but is not limited thereto, and may have any other shape known to one of ordinary skill in the art.

The rear cowling maybe a tubular shape and may be connected to the front cowling 101, such that the rear cowling 102 may be smaller than the front cowling 102, but is not limited thereto.

The central core 110 may include a motor with a single shaft 113 disposed longitudinally along a center portion of the central core 110, such that the shaft 113 exits two opposite sides of the central core 110. As such, ends of the shaft 113 may be visible at end portions of the central core 110. Also, a main fan blade 111 may be disposed at a first end of the shaft 113, and turbine blade may 112 be disposed a second end of the shaft 113, opposite from the first end.

The main fan blade 111 may rotate independently from the turbine blade 112, but is not limited thereto.

The main fan blade 111 may include at least one fan blade, but may also include a plurality of fan blades, as illustrated in FIG. 1A.

The auxiliary fan blade 112 may include at least one fan blade, but may also include a plurality of fan blades, as illustrated in FIG. 1B.

The front of the shaft 113 of the central core 110 may be attached to the main fan blades 111, which may provide a majority of the thrust for the hybrid jet engine 100.

The rear portion of the shaft 113 of the central core 110 may include the turbine blades 112, which may be smaller fan blades that may capture energy provided by the at least one modified Tesla one way valve 130.

The central core 110 may be an electrical portion of the hybrid jet engine 100.

The central core 110 may be attached to the at least one aerodynamic stabilizer 120 and the at least one modified Tesla one way valve 130.

Figure 2A:
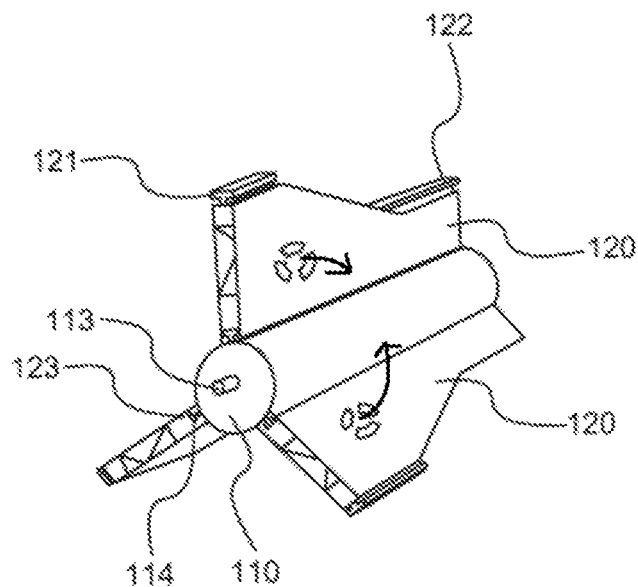
FIG. 2A illustrates a front angled perspective view of a central core with a plurality of aerodynamic stabilizers attached thereto, according to an exemplary embodiment of the present general inventive concept.

FIG. 2A illustrates a front angled perspective view of a central core 110 with a plurality of aerodynamic stabilizers 120 attached thereto, according to an exemplary embodiment of the present general inventive concept.

In order to install an aerodynamic stabilizer 120 onto the central core 110, a central core protrusion 114 may receive an aerodynamic stabilizer slot 123. Specifically, the central core protrusion 114 may be t-shaped, and may slidably receive the aerodynamic stabilizer slot 123 of the aerodynamic stabilizer 120.

Referring to FIG. 2A, three of the aerodynamic stabilizers 120 have been installed onto the central core 110.

Figure 2B:
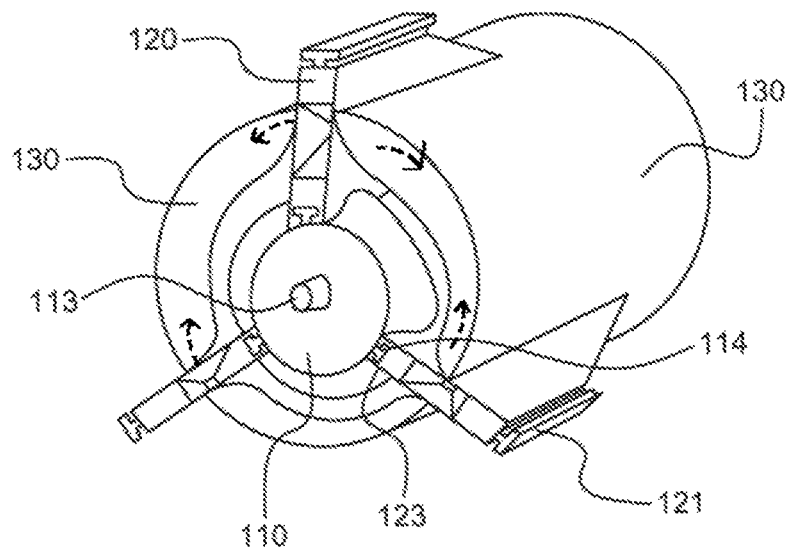
FIG. 2B illustrates a front angled perspective view of the central core with the plurality of aerodynamic stabilizers and a plurality of modified Tesla one way valves attached thereto, according to an exemplary embodiment of the present general inventive concept.

FIG. 2B illustrates a front angled perspective view of the central core 110 with the plurality of aerodynamic stabilizers 120 and a plurality of modified Tesla one way valves 130 attached thereto, according to an exemplary embodiment of the present general inventive concept.

In order to install a modified Tesla one way valve 130 onto the central core 110, a lower portion of the modified Tesla one way valve 130 may receive a lower protrusion 122. Specifically, the lower protrusion 122 may be t-shaped, and may slidably receive the lower portion of the modified Tesla one way valve 130, which may include a slot.

Referring to FIG. 2B, three of the modified Tesla one way valves 130 have been installed onto the central core 110 via the lower protrusion 122.

Figure 3A:
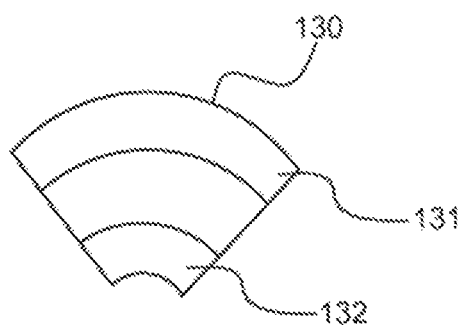
FIG. 3A illustrates a front perspective view of one modified Tesla one way valve, according to an exemplary embodiment of the present general inventive concept.

FIG. 3A illustrates a front perspective view of one modified Tesla one way valve 130, according to an exemplary embodiment of the present general inventive concept.

Figure 3B:
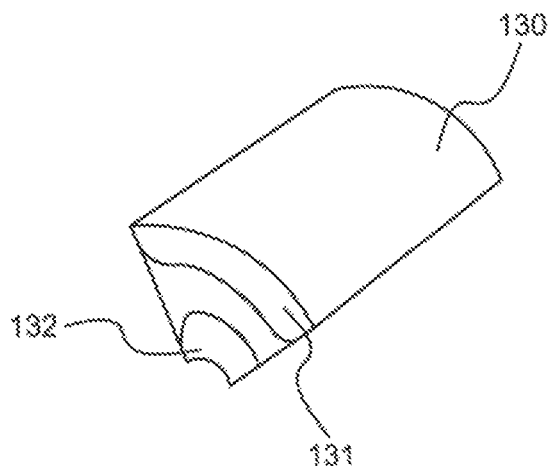
FIG. 3B illustrates a front angled perspective view of the modified Tesla one way valve, according to an exemplary embodiment of the present general inventive concept.

FIG. 3B illustrates a front angled perspective view of the modified Tesla one way valve 130, according to an exemplary embodiment of the present general inventive concept.

Figure 3C:
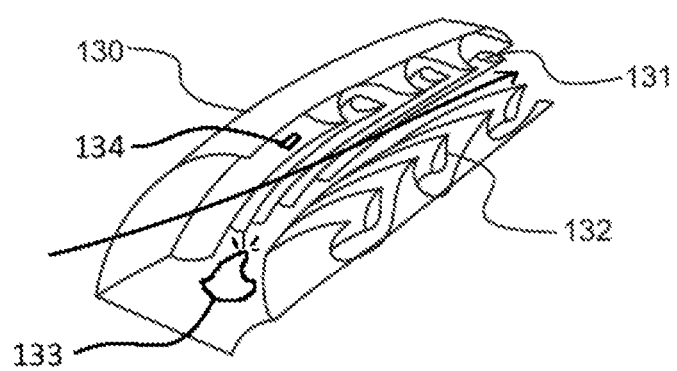
FIG. 3C illustrates a front angled open perspective view of the modified Tesla one way valve, according to an exemplary embodiment of the present general inventive concept.

FIG. 3C illustrates a front angled open perspective view of the modified Tesla one way valve 130, according to an exemplary embodiment of the present general inventive concept.

As illustrated in FIGS. 3A through 3C, the modified Tesla one way valve 130 may include a first curved filter 131 and a second curved filter 132 disposed within the modified Tesla one way valve 130.

Figure 4:
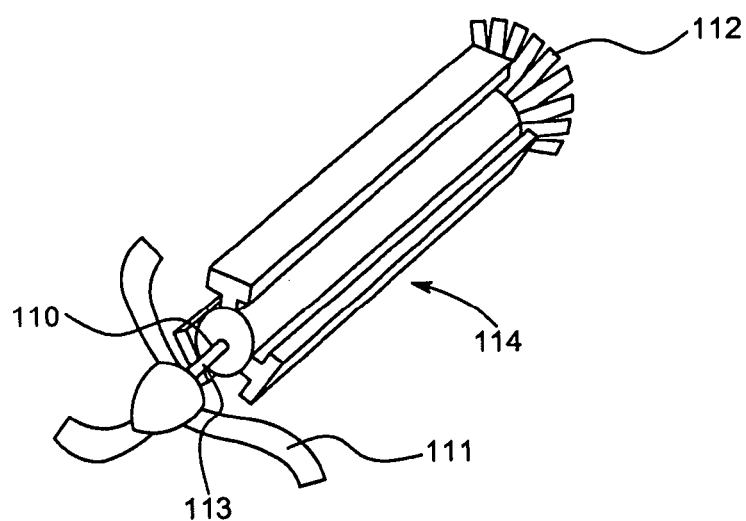
FIG. 4 illustrates a front angled perspective view of the central core, according to an exemplary embodiment of the present general inventive concept.

FIG. 4 illustrates a front angled perspective view of the central core 110, according to an exemplary embodiment of the present general inventive concept.

As stated above, the central core 110 may include the main fan blade 111 disposed at a front end of the central core 110, an turbine blade 112 disposed at a rear end of the central core 110, a shaft 113 disposed within the central core 110 and attached to the main fan blade 111 at a first end and the turbine blade 112 at a second end, and a plurality of central core protrusions 114 extending away from at outer surface of the central core 110 and disposed longitudinally along the outer surface of the central core 110.

Figure 5A:
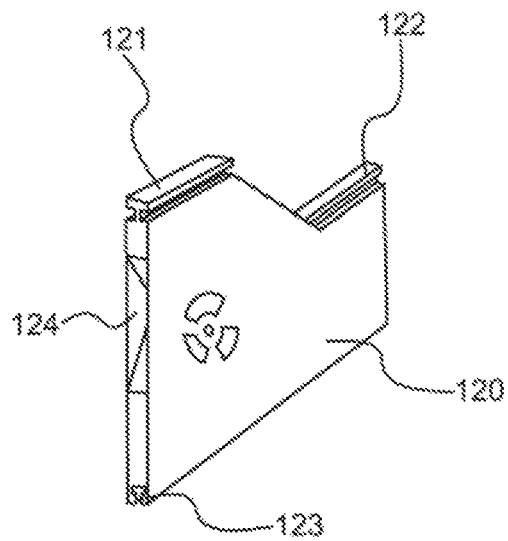
FIG. 5A illustrates a front perspective view of one modified aerodynamic stabilizer, according to an exemplary embodiment of the present general inventive concept.

FIG. 5A illustrates a front perspective view of one modified aerodynamic stabilizer 120, according to an exemplary embodiment of the present general inventive concept.

Figure 5B:
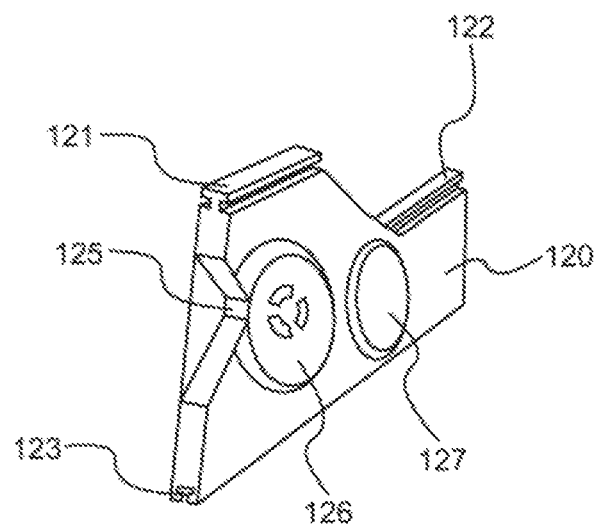
FIG. 5B illustrates a front angled open perspective view of the aerodynamic stabilizer, according to an exemplary embodiment of the present general inventive concept.

FIG. 5B illustrates a front angled open perspective view of the aerodynamic stabilizer 120, according to an exemplary embodiment of the present general inventive concept.

Figure 5C:
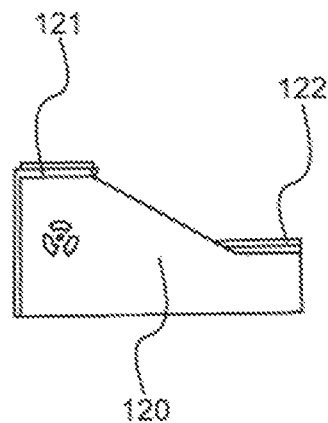
FIG. 5C illustrates a side perspective view of one the aerodynamic stabilizer, according to an exemplary embodiment of the present general inventive concept.

FIG. 5C illustrates a side perspective view of one the aerodynamic stabilizer 120, according to an exemplary embodiment of the present general inventive concept.

Figure 5D:
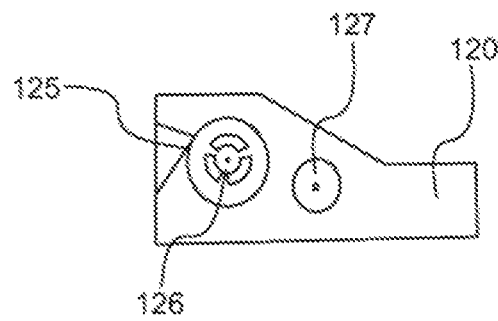
FIG. 5D illustrates a side open perspective view of the aerodynamic stabilizer, according to an exemplary embodiment of the present general inventive concept.

FIG. 5D illustrates a side open perspective view of the aerodynamic stabilizer 120, according to an exemplary embodiment of the present general inventive concept.

Figure 5E:
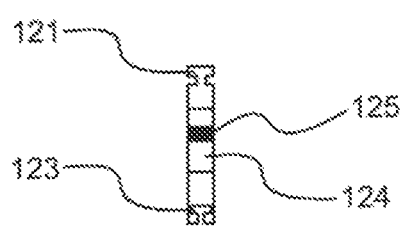
FIG. 5E illustrates a front perspective view of the modified aerodynamic stabilizer, according to an exemplary embodiment of the present general inventive concept.

FIG. 5E illustrates a front perspective view of the modified aerodynamic stabilizer 120, according to an exemplary embodiment of the present general inventive concept.

Figure 5F:
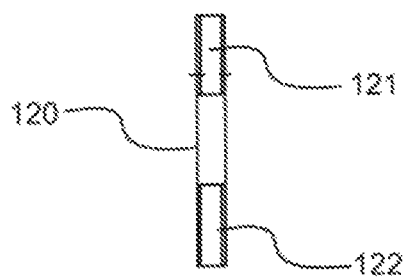
FIG. 5F illustrates a top perspective view of the aerodynamic stabilizer, according to an exemplary embodiment of the present general inventive concept.

FIG. 5F illustrates a top perspective view of the aerodynamic stabilizer 120, according to an exemplary embodiment of the present general inventive concept.

Referring to FIGS. 5A through 5F, the aerodynamic stabilizer 120 may include an upper protrusion 121, the lower protrusion 122, the aerodynamic stabilizer slot 123, a main aperture 124, an auxiliary aperture 125, a bladeless turbine 126, and a generator/alternator 127.

The upper protrusion 121 may be disposed higher than the lower protrusion 122, and may be designed similarly to slide into the front cowling 101 (e.g., into a slot of an inside surface of the front cowling 101.

The bladeless turbine 126 and the generator/alternator 127 may be disposed within a body of the aerodynamic stabilizer 120.

Specifically, the aerodynamic stabilizer 120 may be a short profile, elongated aerodynamic foil, housing the bladeless turbine 126 (e.g., a Tesla Turbine) and the generator/alternator 127.

The generator/alternator 127 may be turned by a gear and/or belt system, by the bladeless turbine 126, providing power to the central core 110 and to electrical systems attached thereto. Due to electrical magnetism properties, the close proximity of the generator/alternator 127 may help power the central core 110 without connecting directly thereto.

The bladeless turbine 126 may be turned by ram air pressure generated by air entering from a front of the hybrid jet engine 100 (the air is generated by the main fan blades 111, via the main aperture 124 disposed at a leading edge (leading edge will face a front of the hybrid jet engine 100) of the aerodynamic stabilizer 120, and then funneling though the auxiliary aperture 125 in order to allow the air to contact the bladeless turbine 126.

Exhaust from the bladeless turbine 126, which will go to the sides perpendicular to the front of the modified Tesla one way valve 130 (i.e., not connected to the central core 110 or the front and rear cowlings 101/102, respectively), may filter into the modified Tesla one way valve 130.

The modified Tesla one way valve 130 (a.k.a., MTOV) may be a modified valvular conduit, by taking a two dimensional one way valve as patented by Nikola Tesla and arching around the central core 110 (like an accordion around a pipe) and between the aerodynamic stabilizers 120.

FIGS. 1A and 1B illustrate three aerodynamic stabilizers 120, so 120-degrees of arching will be needed (i.e., 360-degrees in a circle divided by 3 equals 120). An inlet, or an opening in which the direction of air/fluid moves through in the easiest manner, will be placed towards the front of the hybrid jet engine 100, behind the main fan blades 111. The modified Tesla one way valve 130 will be attached to the central core 110 at its bottom, between each aerodynamic stabilizers 120 to its sides, and located between the main fan blades 111 and the turbine blades 112, towards their inlets and exhausts, respectively.

The ram air from the front of the hybrid jet engine 100 may filter into the inlet and expand towards the outer portion of the hybrid jet engine 100 (i.e., the portion opposite of the central core 110). Due to the shape and nature of the modified Tesla one way valve 130, the air will then be forced towards the central core 110 side of the modified Tesla one way valve 130, thereby compressing it. This will continue throughout the length of the modified Tesla one way valve 130.

The sides attached to the aerodynamic stabilizers 120 will filter the exhaust from the bladeless turbines 126 into the modified Tesla one way valves 130 via a series of openings within the modified Tesla one way valves 130, adding air pressure and compression.

Near a rear portion of the modified Tesla one way valve 130, at a location of expansion, a carburetor or fuel injecting system 133 may add fuel to the expanding air before it begins its compression. After fuel has been introduced and the air begins to compress, an ignition system 134 may ignite the fuel/air mixture. The ignited fuel/air mixture will then be forced out the rear of the hybrid jet engine 100 towards the turbine blades 112. The energy from the ignited fuel/air mixture may then be harnessed from the turbine blades 112 and sent up the shaft 113 in the central core 110 to the main fan blades 111 to continue the cycle. The modified Tesla one way valve 130 is where the combustion of the hybrid jet engine 100 will occur.

Figure 6:
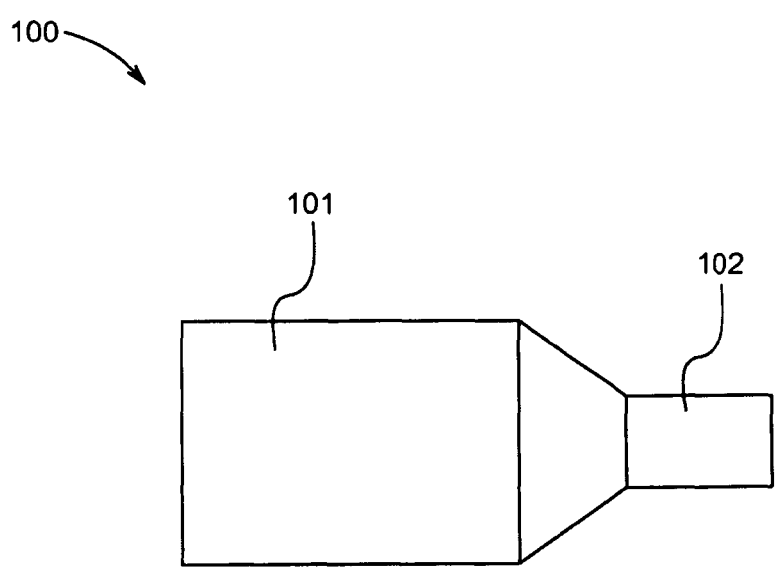
FIG. 6 illustrates a side view of the hybrid jet engine, according to an exemplary embodiment of the present general inventive concept.

FIG. 6 illustrates a side view of the hybrid jet engine 100, according to an exemplary embodiment of the present general inventive concept As illustrated in FIGS. 1A, 1B, and 6, the cowlings may be split into the front and rear cowlings 101 and 102. The front cowling 101 will attach solely to the Aerodynamic Stabilizer/s. The Front Cowling will direct and focus air into the main fan blades 111 and provide protection to anything outside the hybrid jet engine 100 in case of a break in the main fan blades 111. The rear cowling 102 may attach to the aerodynamic stabilizers 120 and the modified Tesla one way valves 130, completely surrounding and encasing them at the rear of the hybrid jet engine 100. The rear cowling 102 may also attach to the vehicle/equipment that the hybrid jet engine 100 is to power. The rear cowling 102 may provide connections for fuel lines and electrical lines, as well as protection from exhaust heat in the event of an unexpected turbine blade 112 failure.

Summary and Functions of Components of the Hybrid Jet Engine 100

The main fan blades 111 may be powered by the shaft 113, and may provide ram air (i.e., thrust/power) to the aerodynamic stabilizer 120, to the modified Tesla one way valve 130.

The shaft 113 may be powered by the central core 110, which may house an electric motor, and the turbine blades 112, which receive exhaust from the modified Tesla one way valves 130. As such, the shaft 113 may provide power to the main fan blades 111.

The aerodynamic stabilizers 120 may take in ram air from main fan blades 111 into the bladeless turbine 126, such that the bladeless turbine 126 turns to provide energy to the generator/alternator 127, and may provide air exhaust to the modified Tesla one way valves 130 and electricity to the central core 130 and the electrical systems.

The modified Tesla one way valves 130 may take in ram air from main fan blades 111 and bladeless turbine 126, injected with fuel and combustible fuel/air mixture near the rear of the hybrid jet engine 100. The modified Tesla one way valves 130 may also provide exhaust and power the turbine blades 112.

The turbine blades 112 may receive exhaust from the modified Tesla one way valves 130, and may provide power to the shaft 113.

The front and rear cowlings 101 and 102, respectively, may help hold the hybrid jet engine 100 together and protect the hybrid jet engine 100 from possible failure from within the hybrid jet engine 100, as well from influences external from the hybrid jet engine 100. The front and rear cowlings 101 and 102, respectively, may also provide focused ram air to the main fan blades 111, provide protection by focusing exhaust from the turbine blades 112, house electrical lines, house fuel lines and house mounting connections.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

The invention claimed is:

1. A hybrid jet engine configured to utilize combustion and electricity, the hybrid jet engine comprising:
    a front cowling having a first tubular shape with a first diameter;
    a rear cowling having a second tubular shape with a second diameter, the rear cowling being connected to the front cowling, wherein the second diameter is less than the first diameter;
    a central core disposed within the front cowling and the rear cowling;
    a shaft disposed longitudinally within the central core;
    a plurality of main fan blades disposed at a first end of the shaft at the front cowling;
    a plurality of turbine blades disposed at a second end of the shaft at the rear cowling;
    at least one aerodynamic stabilizer disposed on a surface of the central core and extending therefrom to provide a connection between the central core and the front cowling; and
    at least one Tesla one way valve disposed on, and extending circumferentially about a portion of, the surface of the central core and configured to receive a first portion of ram air for combustion, form a mixture of a fuel with the first portion of ram air, combust the mixture to form combustion product gases, and provide the combustion product gases to the plurality of turbine blades, wherein the plurality of main fan blades are connected to the plurality of turbine blades via the shaft and are configured rotate in response to rotation of the plurality of turbine blades.

2. The hybrid jet engine of claim 1, wherein a rear portion of the at least one Tesla one way valve includes at least one of a carburetor and fuel injecting system to add the fuel to the first portion of ram air.

3. The hybrid jet engine of claim 2, further comprising:
    an ignition system configured to ignite the mixture.

4. The hybrid jet engine of claim 1, wherein the aerodynamic stabilizer comprises:
    a bladeless turbine disposed at a front portion of the at least one aerodynamic stabilizer and configured to receive a second portion of ram air from the plurality of main fan blades; and
    a generator/alternator disposed at a rear portion of the at least one aerodynamic stabilizer and configured to receive energy from the bladeless turbine in response to the second portion of ram air being received by the bladeless turbine.

5. The hybrid jet engine of claim 4, wherein the at least one aerodynamic stabilizer is configured to provide air exhaust to the at least one Tesla one way valve and electricity to the central core.

6. The hybrid jet engine of claim 1, wherein the at least one Tesla one way valve is configured to receive the first portion of ram air from the plurality of main fan blades and a second portion of ram air from the bladeless turbine, and wherein the at least one Tesla one way valve is configured to be injected with the fuel near a rear portion of the at least one Tesla one way valve.

\* \* \* \* \*